United States Patent
Nishiyama

(10) Patent No.: US 10,574,725 B2
(45) Date of Patent: Feb. 25, 2020

(54) MOBILE TERMINAL FOR REMOTELY OPERATING DEVICE VIA NETWORK, CONTROL METHOD THEREFOR, STORAGE MEDIUM, AND REMOTE SUPPORT SYSTEM

(71) Applicant: CANON KABUSHIKI KAISHA, Tokyo (JP)

(72) Inventor: Masashi Nishiyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/100,371

(22) Filed: Aug. 10, 2018

(65) Prior Publication Data
US 2019/0052696 A1    Feb. 14, 2019

(30) Foreign Application Priority Data
Aug. 14, 2017 (JP) ................... 2017-156464

(51) Int. Cl.
| | | |
|---|---|---|
| G06F 15/16 | (2006.01) | |
| H04L 29/08 | (2006.01) | |
| G06F 9/451 | (2018.01) | |
| H04L 12/46 | (2006.01) | |

(52) U.S. Cl.
CPC ............ *H04L 67/025* (2013.01); *G06F 9/452* (2018.02); *H04L 12/4633* (2013.01); *H04L 67/36* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2007/0130251 A1* | 6/2007 | Ohtsuka | H04L 67/08 709/203 |
| 2009/0240766 A1* | 9/2009 | Kikkawa | H04L 47/27 709/203 |
| 2014/0059667 A1 | 2/2014 | Seo | |

FOREIGN PATENT DOCUMENTS

| | | |
|---|---|---|
| JP | 2012199953 A | 10/2012 |
| JP | 2014042226 A | 3/2014 |

* cited by examiner

*Primary Examiner* — Gary Lafontant
(74) *Attorney, Agent, or Firm* — Rossi, Kimms & McDowell LLP

(57) ABSTRACT

A mobile terminal which enables direct and efficient remote operation via a network. The mobile terminal mediates communication between a first apparatus and a second apparatus when the first apparatus remotely operates the second apparatus having an application server via a network. In a case where a tunneling communication is established, the mobile terminal displays candidates for an application server to which the mobile terminal is connectable, on a display device of the mobile terminal, and carries out a mediating process including transferring data received from the first apparatus to the application server selected by a user from among the candidates and transferring data received from the selected application server to the first apparatus through the tunneling communication.

8 Claims, 9 Drawing Sheets

FIG. 6

| APPLICATION SERVER TYPE | CONNECTION DESTINATION NAME | ADDRESS | PORT |
|---|---|---|---|
| vnc | OPERATING PANEL OF MOBILE TERMINAL | 127.0.0.1 | 5900 |
| vnc | OPERATING PANEL OF IMAGE FORMING APPARATUS | 111.222.333.444 | 5900 |
| webui | WEB UI OF IMAGE FORMING APPARATUS | 111.222.333.444 | TO BE DESIGNATED BY REMOTE SUPPORTER |
| rdp | USER PC DESKTOP IMAGE | - | 3389 |

600

MOBILE TERMINAL FOR REMOTELY OPERATING DEVICE VIA NETWORK, CONTROL METHOD THEREFOR, STORAGE MEDIUM, AND REMOTE SUPPORT SYSTEM

BACKGROUND OF THE INVENTION

Field of the Invention

The present invention relates to a mobile terminal, a control method therefor, and a storage medium, as well as a remote support system, and in particular to a technique for remotely operating devices via a network.

Description of the Related Art

In recent years, such a product as an image forming apparatus has become multifunctional and become sophisticated in functionality, and their functions are performed in combination. For this reason, there are cases where a user does not know how to use the product, or cases where a trouble occurs, for example, the product does not work as intended, the user cannot solve the trouble by himself or herself. In this case, the user calls an inquiry contact called a "call center" to get an answer or solve the trouble. To solve the trouble rapidly on such occasions, a remote support system which is used between a mobile terminal of the user and the call center has been proposed (Japanese Laid-Open Patent Publication (Kokai) No. 2014-42226). In this remote support system, through camera images taken by the mobile terminal of the user, a remote supporter at the call center is able to see in real time the condition of the product which the user would be helped for solving the problem on. In this manner, it is possible to remotely support the user to solve the problem while visually recognizing the condition of the product.

According to the technique described in Japanese Laid-Open Patent Publication (Kokai) No. 2014-42226, however, the remote support representative cannot recognize the condition of the product on the site without camera images taken by the mobile terminal. The remote supporter has to solve a trouble in a manner that requires a lot of time and effort, for example, by giving instructions to the user by telephone or the like, recognize a symptom, and then changing settings and/or executing a job. This presents a problem in which it is indirect and inefficient for an operating side (the call center side) to remotely operate an apparatus on an operated side (the user side).

SUMMARY OF THE INVENTION

The present invention provides a mobile terminal, which enables direct and efficient remote operation via a network, a control method therefore, and a storage medium, as well as a remote support system.

Accordingly, the present invention provides a control method for a mobile terminal that mediates communication between a first apparatus and a second apparatus when the first apparatus remotely operates the second apparatus having an application server via a network, comprising sending and receiving data to and from the first apparatus through a tunneling communication, in a case where the tunneling communication is established, displaying candidates for an application server to which the mobile terminal is connectable, on a display device of the mobile terminal, and carrying out a mediating process including transferring data received from the first apparatus to the application server selected by a user from among the candidates, and transferring data received from the selected application server to the first apparatus through the tunneling communication.

Accordingly, the present invention provides a mobile terminal that mediates communication between a first apparatus and a second apparatus when the first apparatus remotely operates the second apparatus having an application server via a network, comprising a memory device that stores a set of instructions, and at least one processor that executes the set of instructions to send and receive data to and from the first apparatus through a tunneling communication, and in a case where the tunneling communication is established, display candidates for an application server to which the mobile terminal is connectable, on a display device of the mobile terminal, and carry out a mediating process including transferring data received from the first apparatus to the application server selected by a user from among the candidates, and transferring data received from the selected application server to the first apparatus through the tunneling communication.

Accordingly, the present invention provides a remote support system including a first apparatus, a second apparatus having an application server which is remotely operated by the first apparatus via a network, and a mobile terminal that mediates communication between the first apparatus and the second apparatus, comprising a memory device that stores a set of instructions, and at least one processor that executes the set of instructions to, in the first apparatus, send and receive data to and from the mobile terminal through a tunneling communication, and, in the mobile terminal, send and receive data to and from the first apparatus through a tunneling communication, and in a case where a tunneling communication is established between the mobile terminal and the first apparatus, display candidates for an application server to which the mobile terminal is connectable, on a display device of the mobile terminal, and carry out a mediating process including transferring data received from the first apparatus to the application server selected by a user from among the candidates, and transferring data received from the selected application server to the first apparatus through the tunneling communication.

According to the present invention, direct and efficient remote operation via a network is enabled.

Further features of the present invention will become apparent from the following description of exemplary embodiments (with reference to the attached drawings).

BRIEF DESCRIPTION OF THE DRAWINGS

FIG. 6 is a view showing an example of a table including addresses and ports of application servers.

DESCRIPTION OF THE EMBODIMENTS

The present invention will now be described in detail below with reference to the accompanying drawings showing embodiments thereof.

First Embodiment

Figure 1:
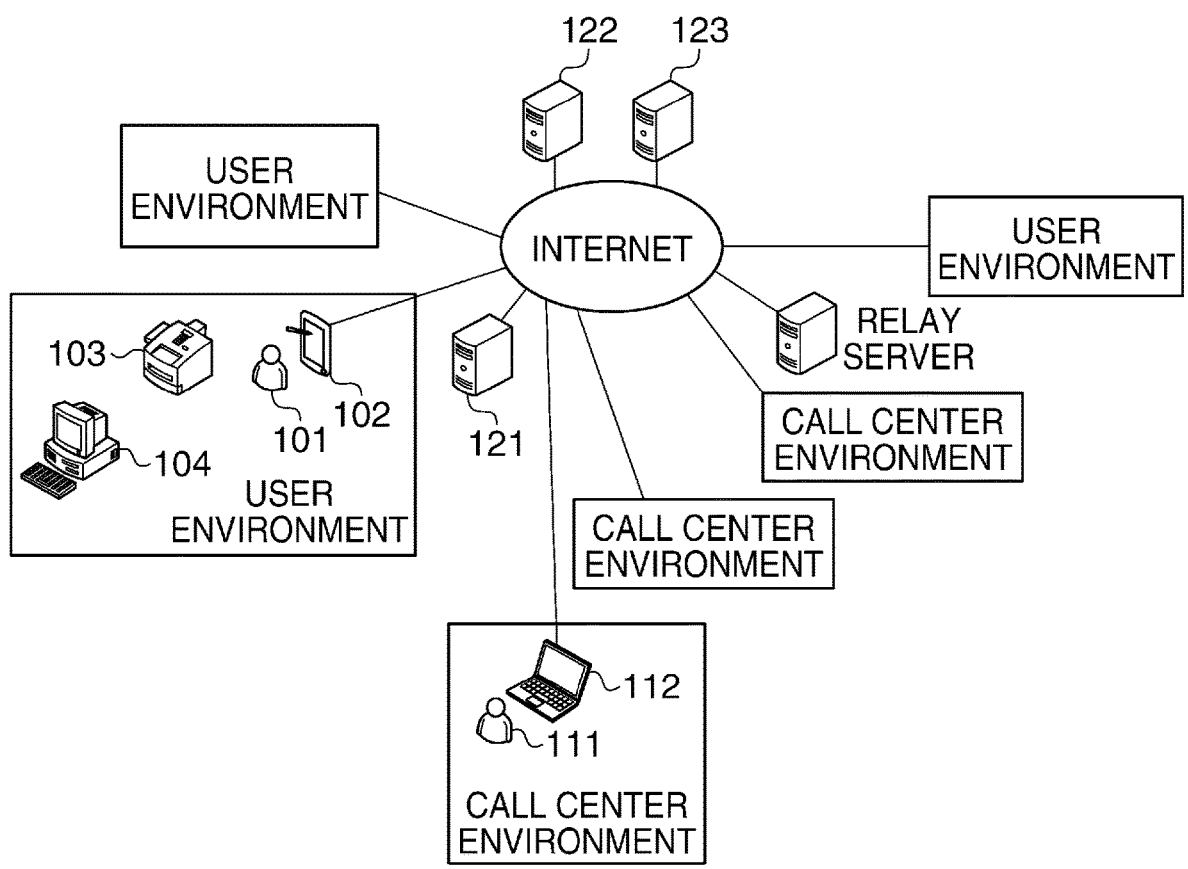
FIG. 1 is a diagram schematically showing an overall arrangement of a remote support system including an information processing apparatus (a mobile terminal).

FIG. 1 is a diagram schematically showing an overall arrangement of a remote support system including an information processing apparatus (a mobile terminal) according to a first embodiment of the present invention. This remote support system includes apparatuses that perform remote operation (remote support) via the Internet, which is a network, and apparatuses that are remotely operated via the Internet. Apparatuses in call center environments, apparatuses in user environments, and various types of relay servers are connected to the Internet.

A remote supporter 111 is a person who provides remote support through a support terminal 112. The support terminal 112 is an apparatus in a call center environment that performs remote operation in the remote support system. There may be a plurality of call center environments. The present embodiment focuses on a call center environment in which the remote supporter 111 and the support terminal 112 belong. A user 101 is a person who is remotely supported by using the remote support system in a user environment. There may be a plurality of user environments. The user environment which the user 101 belongs in includes an image forming apparatus 103 and a user PC 104. The image forming apparatus 103 and the user PC 104 are apparatuses that are subjected to the remote operation by using the remote support system.

A mobile terminal 102 has a remote support function. During remote support, the support terminal 112 acts as a communication partner of the mobile terminal 102. A relay server 121 has a communication function as an HTTP server. The relay server 121 relays communication between the mobile terminal 102 and the support terminal 112. The mobile terminal 102 is a smart device such as a smartphone or a tablet, and has a camera and a speaker and a microphone for voice communication built therein. Both of the mobile terminal 102 and the support terminal 112 have a communication function as HTTP clients.

Each of the HTTP clients executes the POST/GET methods on the HTTP server to send and receive data to and from each other. For example, in a case where data is to be sent from the mobile terminal 102 to the support terminal 112, the mobile terminal 102 sends the data to the relay server 121 by the POST method. The support terminal 112 then receives the data from the relay server 121 by the GET method. This enables the mobile terminal 102 and the support terminal 112 are able to send and receive data to and from each other by using HTTP even if the mobile terminal 102 and the support terminal 112 are respectively shielded by private address areas or firewalls. Communications performed by using this method will hereafter be referred to as "HTTP tunneling" (tunneling communication).

It should be noted that although in the present embodiment, the method of communication through a relay server using HTTP is adopted as the tunneling method, other communication protocols may be adopted. For example, a method of communication without a relay server may be adopted. In the present embodiment, data sent and received by using the tunneling method is referred to as "payload data". Examples of the payload data include video data, voice data, and data for remote operation. Image data taken by a camera of the mobile terminal 102 can be displayed on the support terminal 112 by using HTTP tunneling. This enables the remote supporter 111 to see an image of a product placed in a user environment even from the call center environment.

For example, it is assumed that the user 101 makes a telephone call to the remote supporter 111 to make an inquiry about how to release a paper jam occurring in the image forming apparatus 103. In this case, the remote supporter 111 guides the user 101 to take a picture of an area where the paper jam is occurring with the camera of the mobile terminal 102. This enables the remote supporter 111 to identify the area where the paper jam is occurring by looking at the image and tell the user 101 how to release the paper jam in an appropriate way. Moreover, as long as a server application for remote operation is installed in the user PC 104 and the image forming apparatus 103, these apparatuses can be operated from the support terminal 112 by using HTTP tunneling. Examples of the server application for remote operation include applications using techniques such as VNC (virtual network computing) and RDP (remote desktop protocol). Furthermore, in a case where the image forming apparatus 103 has an Web UI (user interface), the image forming apparatus 103 can also be remotely operated through operation on the Web from a Web browser 362 of the support terminal 112 by using HTTP tunneling.

An authentication server 122 is a server that has an authentication function. In connecting to the relay server 121, the mobile terminal 102 and the support terminal 112 need to be authenticated in advance by the authentication server 122 to obtain authentication token information. A URL management server 123 is a server that manages a URL of the relay server 121. In connecting to the relay server 121, the mobile terminal 102 and the support terminal 112 obtains the URL of the relay server 121 from the URL management server 123 in advance. It should be noted that the URL of the relay server 121 may be set in the mobile terminal 102 and the support terminal 112 in advance without using the URL management server 123. The mobile terminal 102 and the support terminal 112 are each connected to the relay server 121. At this time, the relay server 121 has to identify both of them as communication destinations.

In the present embodiment, a method using a connection number is adopted to identify a communication partner. When the mobile terminal 102 connects to the relay server 121, the relay server 121 issues a connection number of which an issuer is the mobile terminal 102. When connecting to the relay server 121, the support terminal 112 designates this connection number. The relay serer 121 identifies an issuer of a connection number that matches the designated connection number, as a communication partner of the support terminal 112. It should be noted that although in the above described case, the mobile terminal 102 is the issuer of the connection number, the support terminal 112 may be an issuer of a connection number, and the mobile terminal 102 may designate the connection number. It is supposed here that the user 101 and the remote supporter 111 notify each other of connection numbers via telephone calls or electronic mails, and the user 101 or the remote supporter 111 designates the connection number by, for example, inputting the notified connection number into the mobile terminal 102 or the support terminal 112.

Figure 2:
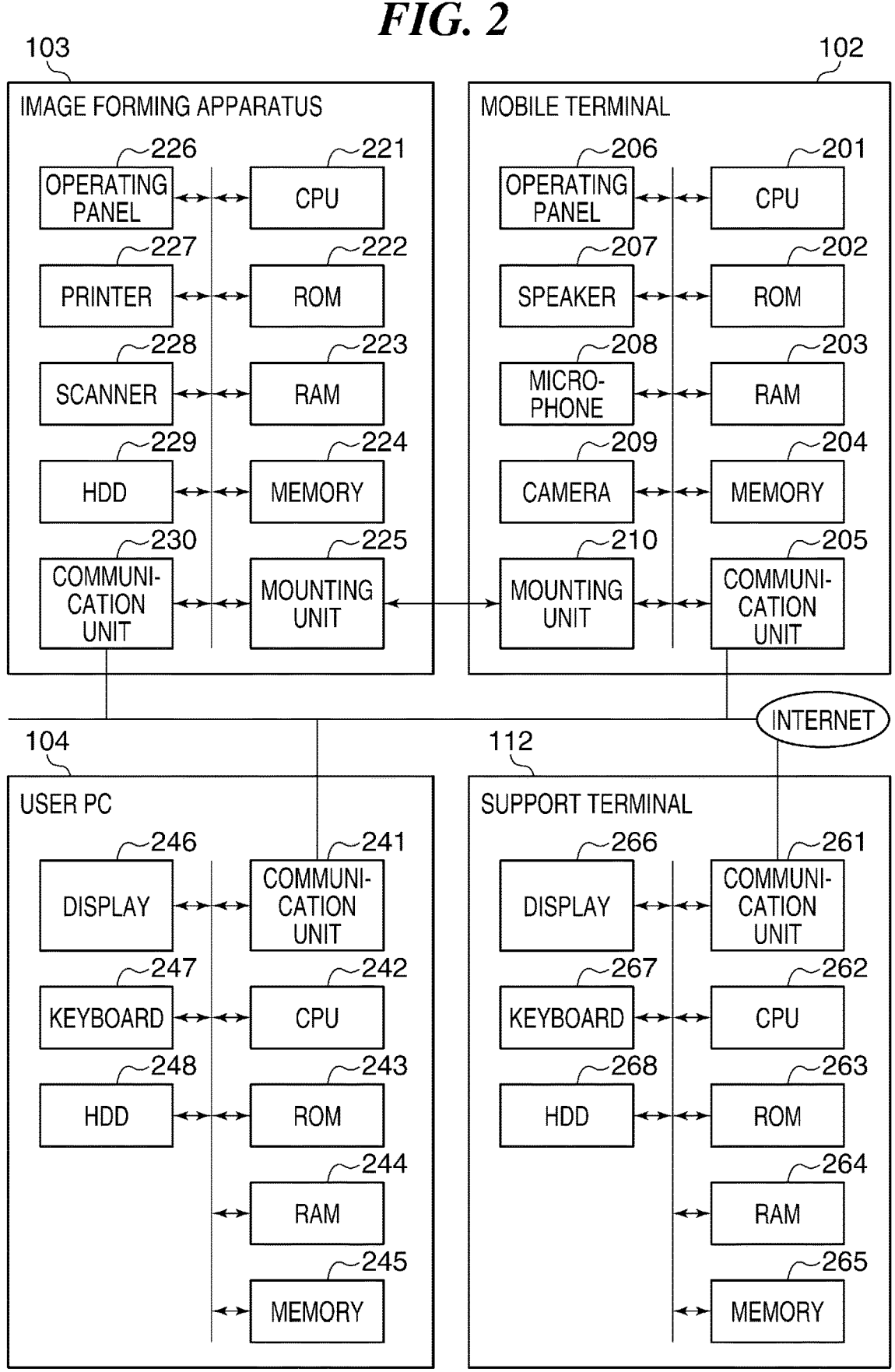
FIG. 2 is a block diagram schematically showing hardware arrangements of a mobile terminal, an image forming apparatus, a user PC, and a support terminal.

FIG. 2 is a block diagram schematically showing hardware arrangements of the mobile terminal 102, the image forming apparatus 103, the user PC 104, and the support terminal 112. The mobile terminal 102, the image forming apparatus 103, the user PC 104, and the support terminal 112 are each connected to the Internet.

In the mobile terminal 102, a CPU 201 carries out various processes for controlling operations based on control programs stored in a ROM 202 or a memory 204. The ROM 202 stores, for example, control programs executable by the CPU 201. A RAM 203 acts mainly as a main memory, a work area, and so forth, for the CPU 201. The memory 204 stores a variety of data such as control programs and electronic documents. A communication unit 205 communicates with other devices via a wired LAN, a wireless LAN, or the like. An operating panel 206 displays various types of screens and receives inputs such as touch operations. A speaker 207 and a microphone 208 are used by a user to call on other mobile terminals or fixed phones. A camera 209 takes images in accordance with instructions from the user. The mobile terminal 102 is detachably connected to the image forming apparatus 103 via a mounting unit 210. The mounting unit 210 enables communications between the mobile terminal 102 and the image forming apparatus 103 via a wired LAN, a wireless LAN, a USB, or the like.

In the image forming apparatus 103, a CPU 221 carries out various processes for controlling operations based on control programs stored in a ROM 222, a memory 224, or an HDD 229. The ROM 222 stores, for example, control programs executable by the CPU 221. A RAM 223 acts mainly as a main memory, a work area, and so forth, for the CPU 221. The memory 224 stores a variety of data such as control programs and electronic documents. The image forming apparatus 103 is detachably connected to the mobile terminal 102 via a mounting unit 225. The mounting unit 225 enables communications between the mobile terminal 102 and the image forming apparatus 103 via a wired LAN, a wireless LAN, a USB, or the like. An operating panel 226 displays various types of screens and receives inputs such as touch operations. A printer 227 forms images and outputs them. A scanner 228 reads and obtains images formed on originals. The HDD 229 stores a variety of data such as control programs and electronic documents. A communication unit 230 communicates with other devices via a wired LAN, a wireless LAN, or the like.

When the mobile terminal 102 is mounted to the image forming apparatus 103 (a mounted state) by using the mounting unit 210 and the mounting unit 225, the mobile terminal 102 becomes able to act as an operating unit for the image forming apparatus 103. This operation will be described later in the description of a second embodiment. Thus, in the first embodiment, the mounting unit 210 and the mounting unit 225 are not absolutely necessary.

In the user PC 104, a communication unit 241 communicates with other devices via a wired LAN, a wireless LAN, or the like. A CPU 242 carries out various processes for controlling operations based on control programs stored in a ROM 243, a memory 245, or an HDD 248. The ROM 243 stores, for example, control programs executable by the CPU 242. A RAM 244 acts mainly as a main memory, a work area, and so forth, for the CPU 242. The memory 245 stores a variety of data such as control programs and electronic documents. A display 246 displays various types of screens. A keyboard 247 receives various types of inputs.

The HDD 248 stores a variety of data such as control programs and electronic documents.

In the mobile terminal 112, a communication unit 261 communicates with other devices via a wired LAN, a wireless LAN, or the like. A CPU 262 carries out various processes for controlling operations based on control programs stored in a ROM 263, a memory 265, or an HDD 268. The ROM 263 stores, for example, control programs executable by the CPU 262. A RAM 264 acts mainly as a main memory, a work area, and so forth, for the CPU 262. The memory 265 stores a variety of data such as control programs and electronic documents. A display 266 displays various types of screens. A keyboard 267 receives various types of inputs. The HDD 268 stores a variety of data such as control programs and electronic documents. It should be noted that the memories 204, 224, 245, and 265 are nonvolatile memories such as flash memories.

Figure 3:
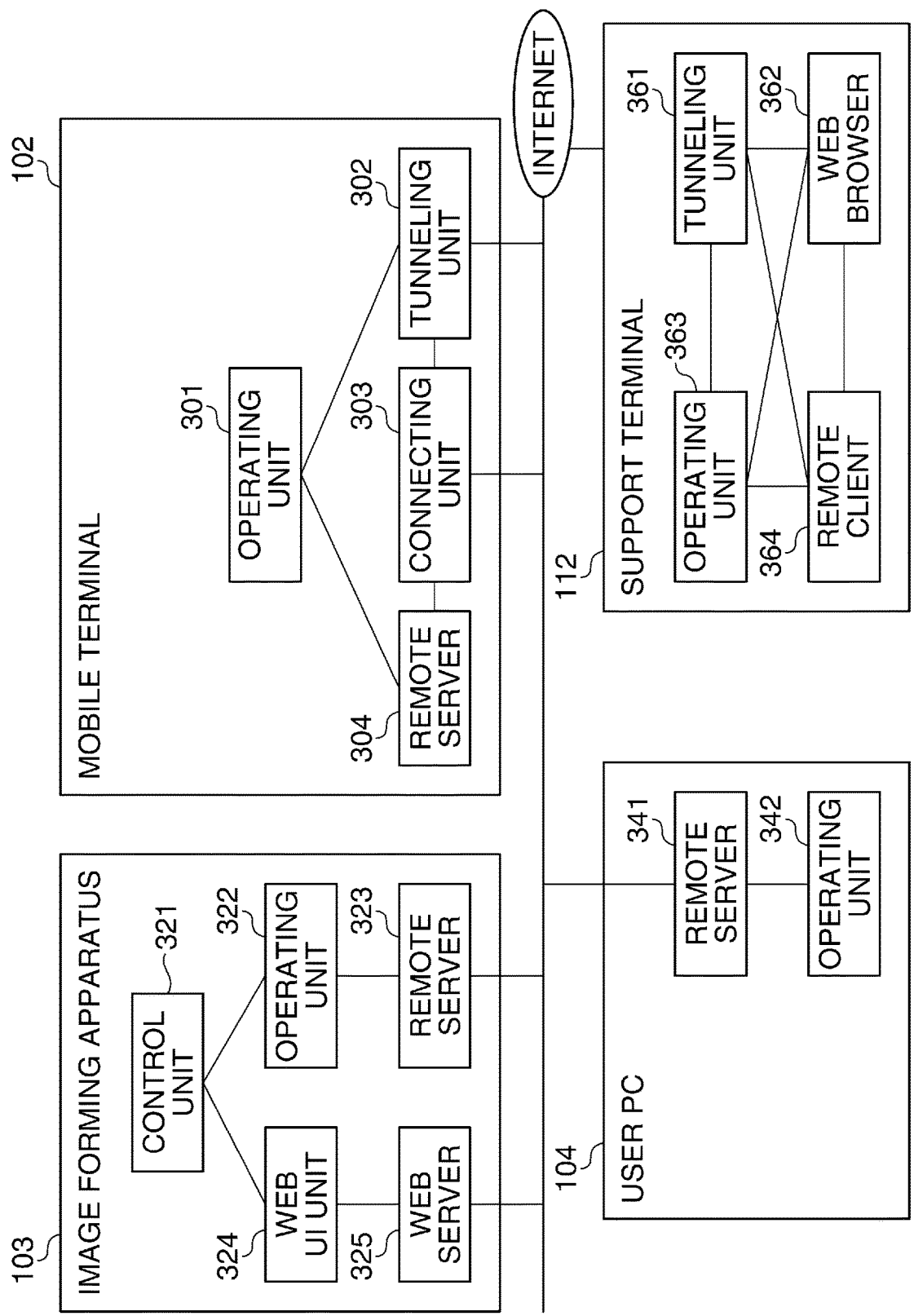
FIG. 3 is a block diagram schematically showing software arrangements of the mobile terminal, the image forming apparatus, the user PC, and the support terminal.

FIG. 3 is a block diagram schematically showing software arrangements of the mobile terminal 102, the image forming apparatus 103, the user PC 104, and the support terminal 112. In these software arrangements, functional units of the mobile terminal 102 are implemented by the CPU 201 executing control programs (modules) expanded from the ROM 202 or the memory 204 into the RAM 203. Functional units of the image forming apparatus 103 are implemented by the CPU 221 executing control programs (modules) expanded from the ROM 222, the memory 224, or the HDD 229 into the RAM 223. Functional units of the user PC 104 are implemented by the CPU 242 executing control programs (modules) expanded from the ROM 243, the memory 245, or the HDD 248 into the RAM 244. Functional units of the support terminal 112 are implemented by the CPU 262 executing control programs (modules) expanded from the ROM 263, the memory 265, or the HDD 268 into the RAM 264.

Referring to FIG. 2, a description of the functional units will be given. An operating unit 301 of the mobile terminal 102 controls the operating panel 206 which is a display device. A tunneling unit 302 and a tunneling unit 361 start an HTTP tunneling process in accordance with starting instructions from the operating unit 301 and an operating unit 363, respectively. The tunneling unit 361 passes payload data, which has been received from a remote client 364 or a Web browser 362, to the tunneling unit 302 by using HTTP tunneling. The tunneling unit 361 passes payload data, which has been received from the tunneling unit 302, to the remote client 364 or the Web browser 362.

A connecting unit 303 carries out a mediating process between the tunneling unit 302 and each application server. Namely, the connecting unit 303 transfers the data received from the support terminal 112 via a tunneling communication to an application server which is a connection destination (hereafter referred to as "connection destination application server") and also transfers the data received from the application server to the support terminal 112 through a tunneling communication. Application servers that can be connection destinations include a remote server 304, a remoter server 323, a Web server 325, and a remote server 341. Thus, upon receiving payload data from the tunneling unit 302, the connecting unit 303 transfers the received payload data to the connection destination application server. Further, upon receiving payload data from the connection destination application server, the connecting unit 303 passes the received payload data to the tunneling unit 302. This process sequence will be described later with reference to FIG. 4.

The remote server 304 is an application server for remotely controlling the operating unit 301. The remote server 323 is an application server for remotely controlling an operating unit 322. The remote server 341 is an application server for remotely controlling an operating unit 342. Examples of these remote servers include servers using VNC and RDP techniques. The Web server 325 is a server for invoking a Web UI unit 234 in response to a request from a client through the Web browser 362, or the like. A control unit 321 controls the entire image forming apparatus 103 based on operations received by the operating unit 322 or the Web UI unit 324.

It should be noted that in the present remote support system, the remote client 364 or the Web browser 362 can be run on the support terminal 112. It can be supposed that a remote client or a Web browser is indirectly operated by the mobile terminal 102 being remotely operated while the remote client or the Web browser is run on the mobile terminal 102. However, with this manner, operational responsivity is deteriorated by further running an application for remote operating on an operating unit that is being remotely operated. The present remote support system is superior to the above-described indirect method in terms of operational responsivity because the remote client 364 or the Web browser 362 is started on the support terminal 112 and directly operated.

Figure 4:
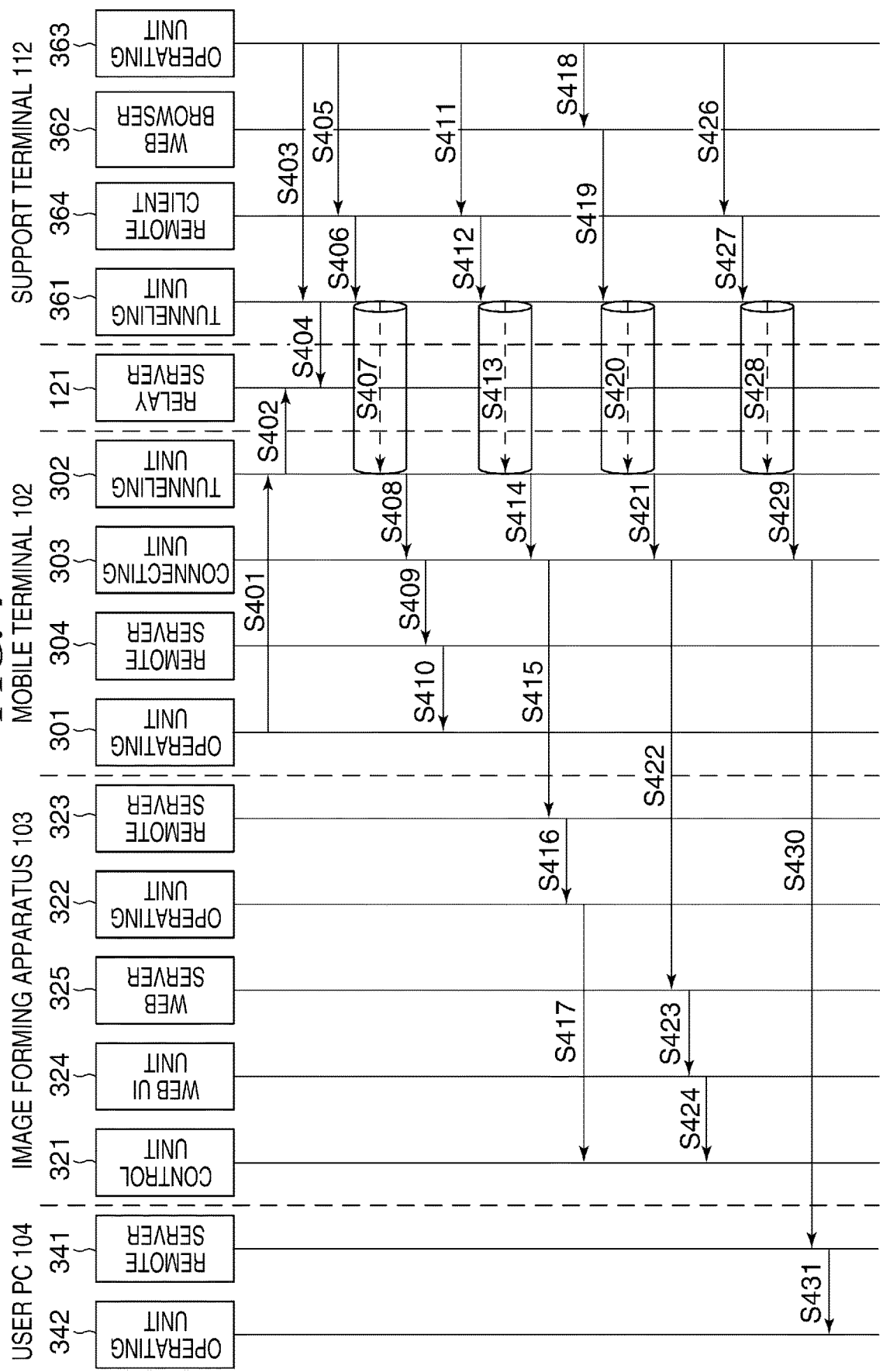
FIG. 4 is a diagram showing a process sequence.

FIG. 4 is a diagram showing a process sequence executed by the apparatuses in the present remote support system. Steps performed in the mobile terminal 102 are implemented by the CPU 201 executing control programs (modules) expanded from the ROM 202 or the memory 204 into the RAM 203. Steps performed in the image forming apparatus 103 are implemented by the CPU 221 executing control programs (modules) expanded from the ROM 222, the memory 224, or the HDD 229 into the RAM 223. Steps performed in the user PC 104 are implemented by the CPU 242 executing control programs (modules) expanded from the ROM 243, the memory 245, or the HDD 248 into the RAM 244. Steps performed in the support terminal 112 are implemented by the CPU 262 executing control programs (modules) expanded from the ROM 263, the memory 265, or the HDD 268 into the RAM 264.

In step S401, upon receiving an instruction from the user 101, the operating unit 301 of the mobile terminal 102 instructs the tunneling unit 302 to start HTTP tunneling. In step S402, the tunneling unit 302 connects to the relay server 121 by using HTTP tunneling (herein after referred to as "HTTP tunneling connection"). On the other hand, in step S403, upon receiving an instruction from the remote supporter 111, the operating unit 363 of the support terminal 112 instructs the tunneling unit 361 to start HTTP tunneling. In step S404, the tunneling unit 361 performs an HTTP tunneling connection to the relay server 121. As a result of the steps S402 and S404, an HTTP tunnel is created between the mobile terminal 102 and the support terminal 112. After a tunneling communication is established, communications in steps S407, S413, S420, and S428 use HTTP tunneling.

Steps S405 to S410 represent a flow of a process in which the remote supporter 111 remotely operates the operating unit 301 of the mobile terminal 102 from the support terminal 112. This process is carried out in a case where remotely operating the operating unit 301 of the mobile terminal 102 is needed to solve a trouble. In the step S405, upon receiving an instruction from the remote supporter 111, the operating unit 363 of the support terminal 112 instructs the remote client 364 to start a remote operation. In the step S406, the remote client 364 passes data for remote operation (hereafter referred to as "remote operation data") as payload data to the tunneling unit 361. In the step S407, the tunneling unit 361 passes the received remote operation data to the tunneling unit 302 of the mobile terminal 102 via the HTTP tunneling. In the step S408, the tunneling unit 302 passes the received remote operation data to the connecting unit 303. In the step S409, the connecting unit 303 connects to the remote server 304 and passes the received remote operation data to the remote server 304. In the step S410, the remote server 304 operates the operating unit 301 based on the received remote operation data. On the other hand, screen data on the operating unit 301 for indicating a result of the remote operation is passed from the operating unit 301 to the operating unit 363 of the support terminal 112 by following a path contrary to the path used in the steps S405 to S410.

Steps S411 to S417 represent a flow of a process in which the remote supporter 111 remotely operates the operating unit 322 of the image forming apparatus 103 from the support terminal 112. This process is carried out in a case where remotely operating the operating unit 322 of the image forming apparatus 103 is needed to solve a trouble. The descriptions of steps S411 to S414 are the same as those of steps S405 to S408, and hence descriptions thereof are omitted. In the step S415, the connecting unit 303 connects to the remote server 323 of the image forming apparatus 103, and passes the received remote operation data to the remote server 323. In the step S416, the remote server 323 operates the operating unit 322 based on the received remote operation data. In the step S417, the operating unit 322 controls the control unit 321. Screen data on the operating unit 322 for indicating a result of the remote operation is passed from the operating unit 322 to the operating unit 363 of the support terminal 112 by following a path contrary to the path used in the steps S411 to S416.

Steps S418 to S424 represent a flow of a process in which the remote supporter 111 remotely operates the Web UI unit 324 of the image forming apparatus 103 from the support terminal 112. This process is carried out in a case where remotely operating the Web UI unit 324 of the image forming apparatus 103 is needed to solve a trouble. In the step S418, upon receiving an instruction from the remote supporter 111, the operating unit 363 instructs the Web browser 362 to start a remote operation. In the step S419, the Web browser 362 passes remote operation data as payload data to the tunneling unit 361. The descriptions of steps S420 and S421 are the same as those of the steps S407 and S408, and hence descriptions thereof are omitted. In the step S422, the connecting unit 303 connects to the Web server 325 of the image forming apparatus 103, and passes the received remote operation data to the Web server 325. In the step S423, the Web server 325 operates the Web UI unit 324 based on the received remote operation data. In the step S424, the Web UI unit 324 controls the control unit 321. Web screen data on the Web UI unit 324 for indicating a result of the remote operation is passed from the Web UI unit 324 to the operating unit 363 of the support terminal 112 by following a path contrary to the path used in the steps S418 to S423.

Steps S426 to S431 represent a flow of a process in which the remote supporter 111 remotely operates the operating unit 342 of the user PC 104 from the support terminal 112. This process is carried out in a case where remotely operating the operating unit 342 of the user PC 104 is needed to solve a trouble. The descriptions of steps S426 to S429 are the same as those of the steps S405 to S408, and hence descriptions thereof are omitted. In the step S430, the connecting unit 303 connects to the remote server 341 of the user PC 104, and passes the received remote operation data to the remote server 341. In the step S431, the remote server 341 operates the operating unit 342 based on the received remote operation data. Screen data on the operating unit 342 for indicating a result of the remote operation is passed from the operating unit 342 to the operating unit 363 of the support terminal 112 by following a path contrary to the path used in the steps S426 to S431.

It should be noted that in each of the steps S409, S415, S422, and S430, the connecting unit 303 determines which application server, among the remote server 304, the remote server 323, the Web server 325, and the remote server 341, is to be connected with. How to make this determination will be described later with reference to FIG. 5.

Figure 5:
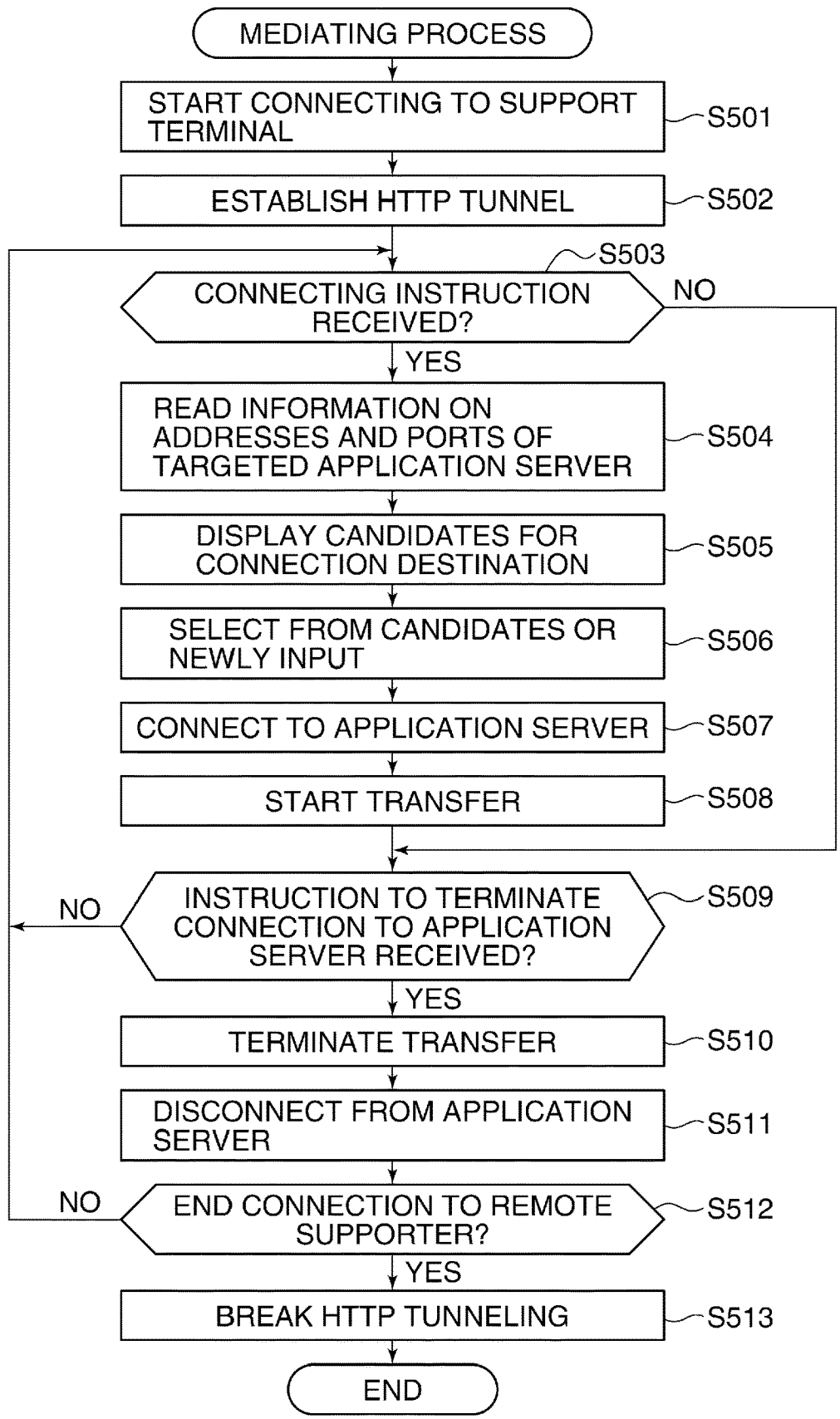
FIG. 5 is a flowchart showing a mediating process.

Thus, the mobile terminal 102 is an information processing apparatus equipped with an HTTP proxy function. When the support terminal 112 which is an operating apparatus remotely operates an operated apparatus (the image forming apparatus 103 or the user PC 104) which has an application server, the mobile terminal 102 acts as an intermediary for communication between the operating apparatus and the operated apparatus. Referring to FIGS. 5 and 6, a description will be given of a mediating process which carried out by the mobile terminal 102 during remote operation by the support terminal 102.

FIG. 5 is a flowchart showing the mediating process. FIG. 6 is a view showing an example of a table including addresses and ports of application servers. The process of the flowchart shown in FIG. 5 is implemented by the CPU 201 of the mobile terminal 102 executing control programs expanded from the ROM 202 or the memory 204 into the RAM 203. Thus, an entity on hardware that carries out this process is the CPU 201. However, in the following description, it is assumed that the functional units in the software shown in FIG. 3 are entities that carry out this process. The control programs executed in the mobile terminal 102 should not always be stored in advance in the ROM 202 or the like, but may be obtained and installed afterward.

First, in step S501, upon receiving an instruction to start remote support from the operating panel 206, the operating unit 301 starts connecting the remote supporter 111 to the support terminal 112 (corresponding to the step S401 in FIG. 4). In step S502, the tunneling unit 302 starts an HTTP tunneling process for creating an HTTP tunneling between the mobile terminal 102 and the support terminal 112 (corresponding to the step S402 in FIG. 4). In step S503, the connecting unit 303 analyzes payload data received by using HTTP tunneling and determines whether or not a connecting instruction to connect to an application server has been received.

When the connecting unit 303 determines that the connecting instruction to connect to the application server has not been received, the process proceeds to step S509. On the other hand, when the connecting unit 303 determines that the connecting instruction to connect to the application server has been received, the process proceeds to step S504. Here, when sending the payload data (corresponding to the steps S407, S413, S420, and S428 in FIG. 4), the tunneling unit 361 can include information, which indicates a type of the application server, in the payload data. In step S504, the connecting unit 303 loads the table 600 in FIG. 6, that is, information about addresses and ports of application servers.

The table 600 is stored in the memory 204. The table 600 may be automatically created by the connecting unit 303 obtaining conditions of the respective application servers or may be set in advance by the user 101. The table 600 includes application server types. A type "vnc" indicates an application server using a VNC technique. A type "webui" indicates a Web server for a Web UI. A type "rdp" indicates an application server using an RDP technique.

In step S505, the operating unit 301 causes the operating panel 206 to display candidates for an application server that is to be a connection destination based on the payload data (connecting instruction) received in the step S503 and the application server types registered in the table 600. In this way, the candidates for the application server, to which the mobile terminal 102 is connectable, are displayed on the operating panel 206 of the mobile terminal 102. For example, in a case where the type included in the payload data received in the step S503 is registered in the table 600, the operating unit 301 causes the operating panel 206 to display application servers corresponding to this type as the candidates for the connection destination.

In step S506, the operating unit 301 determines the application server that is to be the connection destination. For example, in a case where one application server is uniquely determined based on the type included in the payload data, the only one application server corresponding to this type is displayed on the operating panel 206, and hence the operating unit 301 determines this displayed application server as the connection destination. In this case, the process is simplified. In a case where there is a plurality of application servers corresponding to the type included in the payload data, the operating unit 301 causes the operating panel 206 to display the plurality of application servers as candidates, prompts the user 101 to select one application server from among the displayed candidates, and determines the selected application server as the connection destination. With the displayed candidates, the user 101 easily determines the application server that is to be the connection destination. By including information on the type of the application server in the payload data, the support terminal 112 is able to designate candidates for the connection destination.

It should be noted that in a case where no application server corresponding to the type included in the payload data is registered, or no type is included in the payload data, the operating unit 301 does not display candidates for the application server on the operating panel 206. In this case, the operating unit 301 prompts the user 101 to newly input, through the operating panel 206, an address and a port number as information indicating an application server that is to be a connection destination. The operating unit 301 determines the application server corresponding to the newly input address and port number as the connection destination. The user 101 is able to designate a desired connection destination from his or her own user environment. It should be noted that the address and port number newly input here are reflected (additionally registered) in the table 600 and added to a list of candidates to be displayed next time. Thus, the operating unit 301 determines the application server (a connection destination application server) (the remote server 304, the remote server 323, the Web server 325, or the remote server 341) that is to be the connection destination.

In step S507, based on the address and port number, the connecting unit 303 carries out a connecting process on the application server determined as the connection destination. In step S508, the connecting unit 303 starts transferring the payload data between the application server, in which the connecting process has been carried out, and the tunneling unit 302. This enables remote operation of the application server from the support terminal 112 through mediation of the mobile terminal 102. After that, the process proceeds to step S509.

In the step S509, the connecting unit 303 analyzes payload data received by using HTTP tunneling and determines whether or not the instruction to terminate connection with the application server has been received. In a case where the instruction to terminate connection with the application server has not been received, the connecting unit returns the process to the step S503. On the other hand, in a case where the instruction to terminate connection with the application server has been received, the connecting unit 303 stops transferring the payload data between the connected application server and the tunneling unit 302, in step S510. Then, in step S511, the connecting unit 303 disconnects from the connected application server.

In step S512, according to whether or not a remote support stop instruction input from the operating panel 206 is detected, the operating unit 301 determines whether or not to terminate the connection to the remote supporter 111. In a case where input of the remote support stop instruction is not detected, the operating unit 301 returns the process to the step S503. On the other hand, in a case where input of the remote support stop instruction is detected, and the operating unit 301 decides to terminate the connection to the remote supporter 111, the tunneling unit 302 breaks the HTTP tunneling between the tunneling unit 302 and the tunneling unit 361 in step S513, and terminates the process shown in FIG. 5.

In the above described manner, the remote supporter 111 is able to directly operate the Web UI unit 324 as well as the operating unit of the image forming apparatus 103, the user PC 104, or the mobile terminal 102 via the HTTP tunneling between the mobile terminal 102 and the support terminal 112.

According to the present embodiment, when the support terminal 112 remotely operates an apparatus on an operated side such as the image forming apparatus 103, the mobile terminal 102 mediates communication between the apparatus on the operated side and the support terminal 112. Namely, in response to a tunneling communication being established between the apparatus on the operated apparatus and the support terminal 112, the mobile terminal 102 communicates with the application server that is the connection destination. Then, the mobile terminal 102 mediates data transfer between an application server of the apparatus on the operated side and the support terminal 112 through the tunneling communication (HTTP tunneling). This enables the apparatus on the operating side (the support terminal 112) to provide direct and efficient remote support for the apparatus on the operated side. When a trouble occurs in a product, the remote supporter 111 is able to remotely operate an operating unit and a Web UI of the product in much the same way he or she directly operates them, which enables more effective remote support than the conventional remote support which is performed only with camera images.

Second Embodiment

In the above description of the first embodiment of the present invention, the mounting unit 210 and the mounting unit 225 are not connected together, that is, the mobile terminal 102 is not mounted to the image forming apparatus 103 (non-mounted state). In the second embodiment of the present invention, an operation performed in a state where the mounting unit 210 and the mounting unit 225 are connected together, that is, the mobile terminal 102 is mounted to the image forming apparatus 103 (mounted state) is described. A state where the mobile terminal 102 is mounted to the image forming apparatus 103 means a state where the mounting unit 210 and the mounting unit 225 are connected together by a wired LAN, a wireless LAN, a USB, or the like, which is different from the Internet, and the mobile terminal 102 and the image forming apparatus 103 are able to communicate with each other. In a case where the mobile terminal 102 is mounted to the image forming apparatus 103, the mobile terminal 102 acts as an operating unit for the image forming apparatus 103, and the support terminal 112 is able to use the operating unit 301 of the mobile terminal 102 as an operating unit for the image forming apparatus 103 by remote operation. This operation mode is referred to as an "mounted mode".

Figure 7:
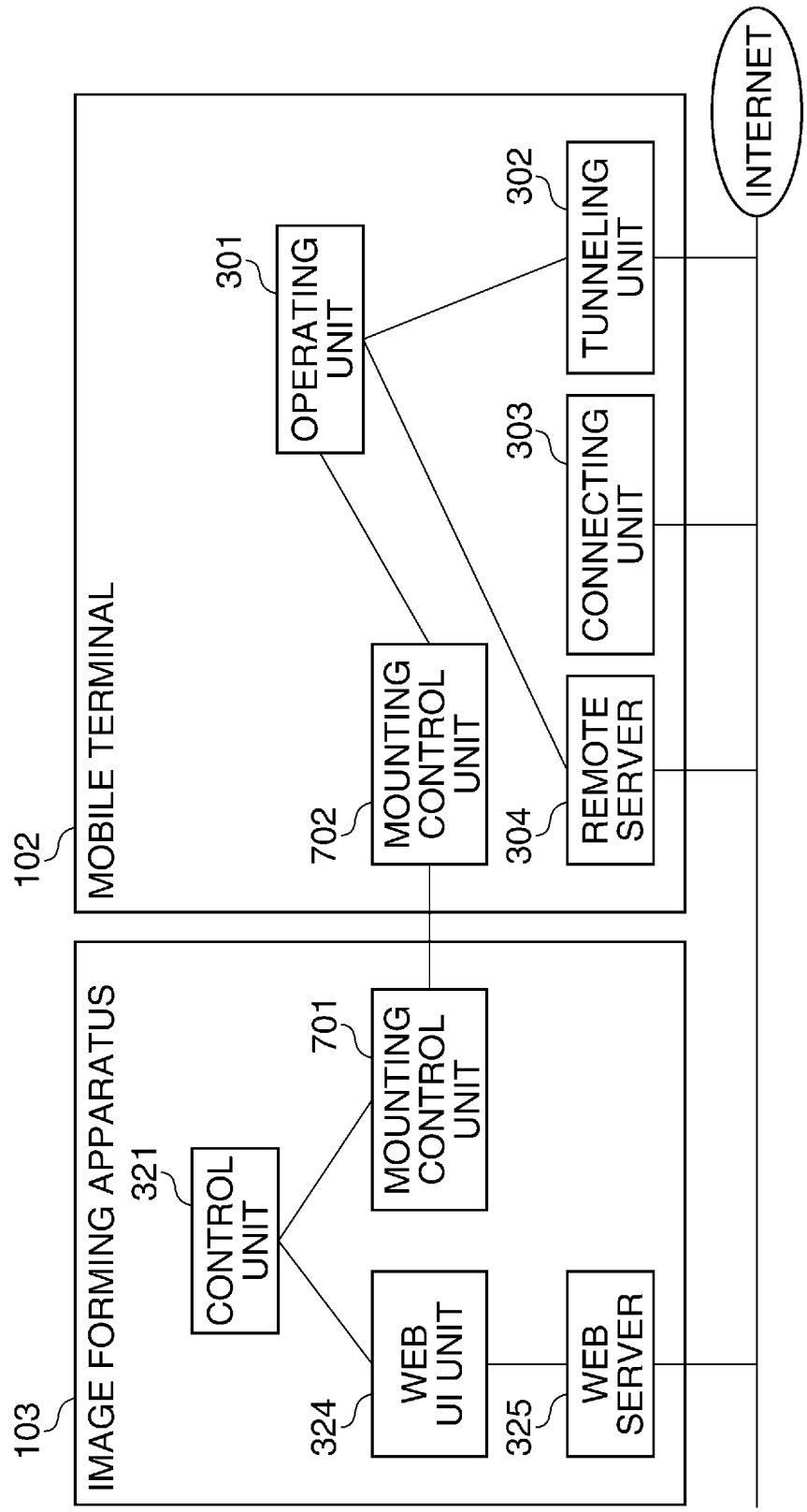
FIG. 7 is a block diagram schematically showing software arrangements of the mobile terminal and the image forming apparatus in a state where the mobile terminal is mounted to the image forming apparatus.

FIG. 7 is a block diagram schematically showing software arrangements of the mobile terminal 102 and the image forming apparatus 103 in the state where the mobile terminal 102 is mounted to the image forming apparatus 103 (mounted state). It should be noted that software arrangements of the user PC 104 and the support terminal 112 are the same as those shown in FIG. 3, and therefore, illustration and description thereof are omitted.

A mounting control unit 702 of the mobile terminal 102 controls the mounting unit 210 to perform mounting and demounting of the mobile terminal 102 with the image forming apparatus 103. A mounting control unit 701 of the image forming apparatus 103 controls the mounting unit 225 to perform mounting and demounting of the image forming apparatus 103 with the mobile terminal 102. In a case where the mobile terminal 102 is mounted to the image forming apparatus 103, that is, while they are in a mounted mode, the operating unit 301 of the mobile terminal 102 acts as an operating unit for the image forming apparatus 103. In a case where the mobile terminal 102 is not mounted to the image forming apparatus 103 (non-mounted state), that is, while they are in a normal mode, the operating unit 301 of the mobile terminal 102 and the operating unit 322 of the image forming apparatus 103 act as operating units for the respective apparatuses to which they belong. In other words, in the normal mode, which is not the mounted mode, the mobile terminal 102 causes the operating unit 301 of the mobile terminal 102 to act as an operating unit therefor. That is, the mobile terminal 102 selectively operates the operating unit 301 of the mobile terminal 102 in the mounted mode or the normal mode in accordance with whether or not the mobile terminal 102 and the image forming apparatus 103 are in a predetermined state (the mounted state).

Figure 8:
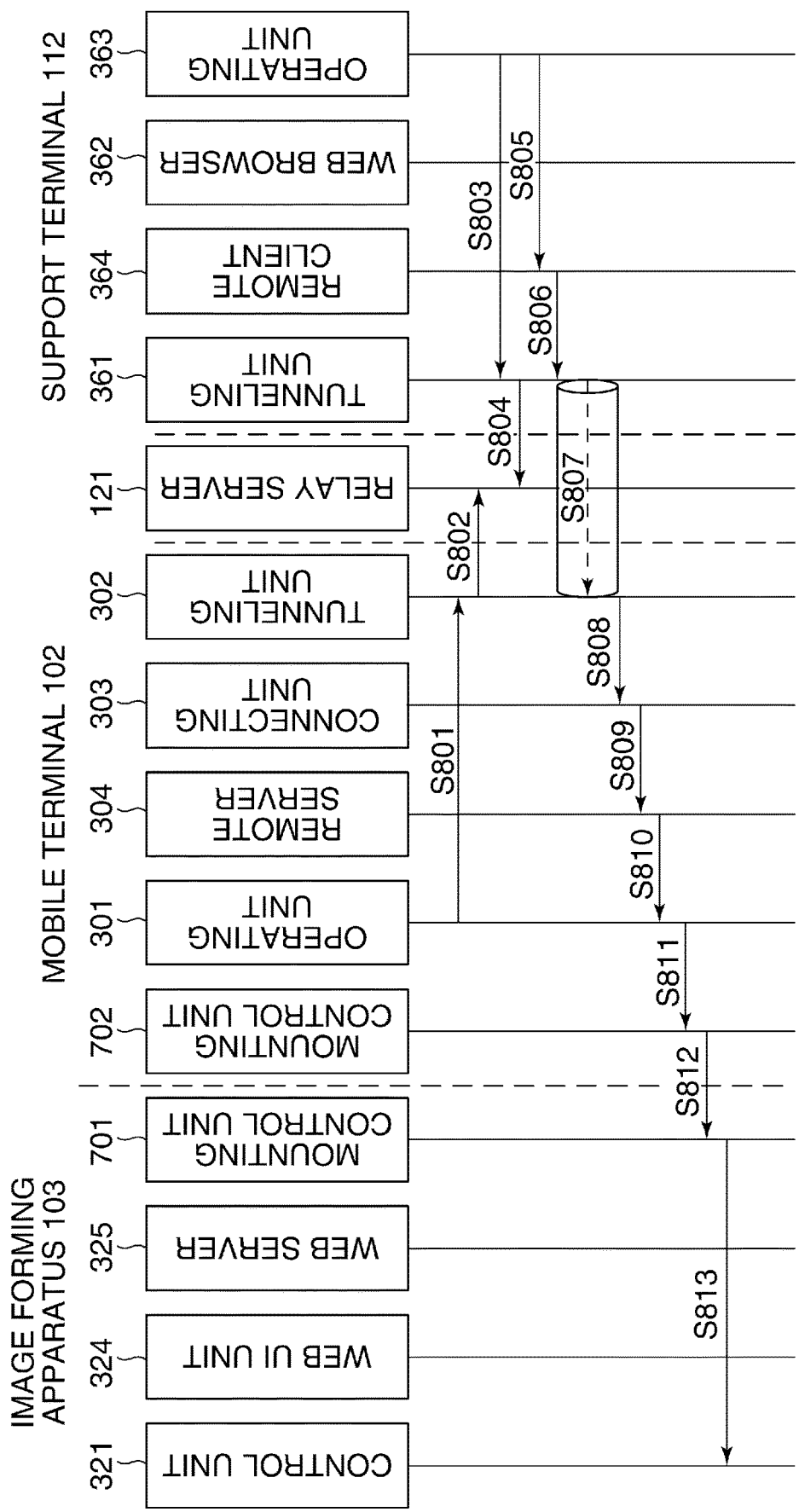
FIG. 8 is a diagram showing a process sequence in a state where the mobile terminal is mounted to the image forming apparatus.

FIG. 8 is a diagram showing a process sequence in each of the apparatuses of the present remote support system in the state where the mobile terminal 102 is mounted to the image forming apparatus 103 (mounted state). The descriptions of steps S801 to S804 are the same as those of steps shown in S401 to S404 in FIG. 4, and therefore, descriptions thereof are omitted.

Steps S805 to S813 represent a flow of a process in which the remote supporter 111 remotely operates an operating unit of the image forming apparatus 103 from the support terminal 112. This process is carried out in a case where remotely operating an operating unit of the image forming apparatus 103 is needed so as to solve a trouble. The descriptions of steps S805 to S808 are the same as the steps as those of S405 to S408 in FIG. 4, and therefore description thereof are omitted. In the step S809, the connecting unit 303 connects to the remote server 304 of the mobile terminal 102, and passes the received remote operation data to the remote server 304. Since the operating unit 301 of the mobile terminal 102 is acting as an operating unit for the image forming apparatus 103, a communication partner of the connecting unit 303 is the remote server 304 of the mobile terminal 102 in terms of remote operation as well. In the step S810, based on the received remote operation data, the remote server 304 operates the operating unit 301. In the steps S811 to S813, the operating unit 301 passes control commands based on results of operation performed in the support terminal 112 to the control unit 321 via the mounting control unit 702 and the mounting control unit 701. Screen data for indicating results of the remote operation is passed from the operating unit 301 to the operating unit 363 of the support terminal 112 by following a path contrary to the path used in the steps S805 to S813.

Figure 9:
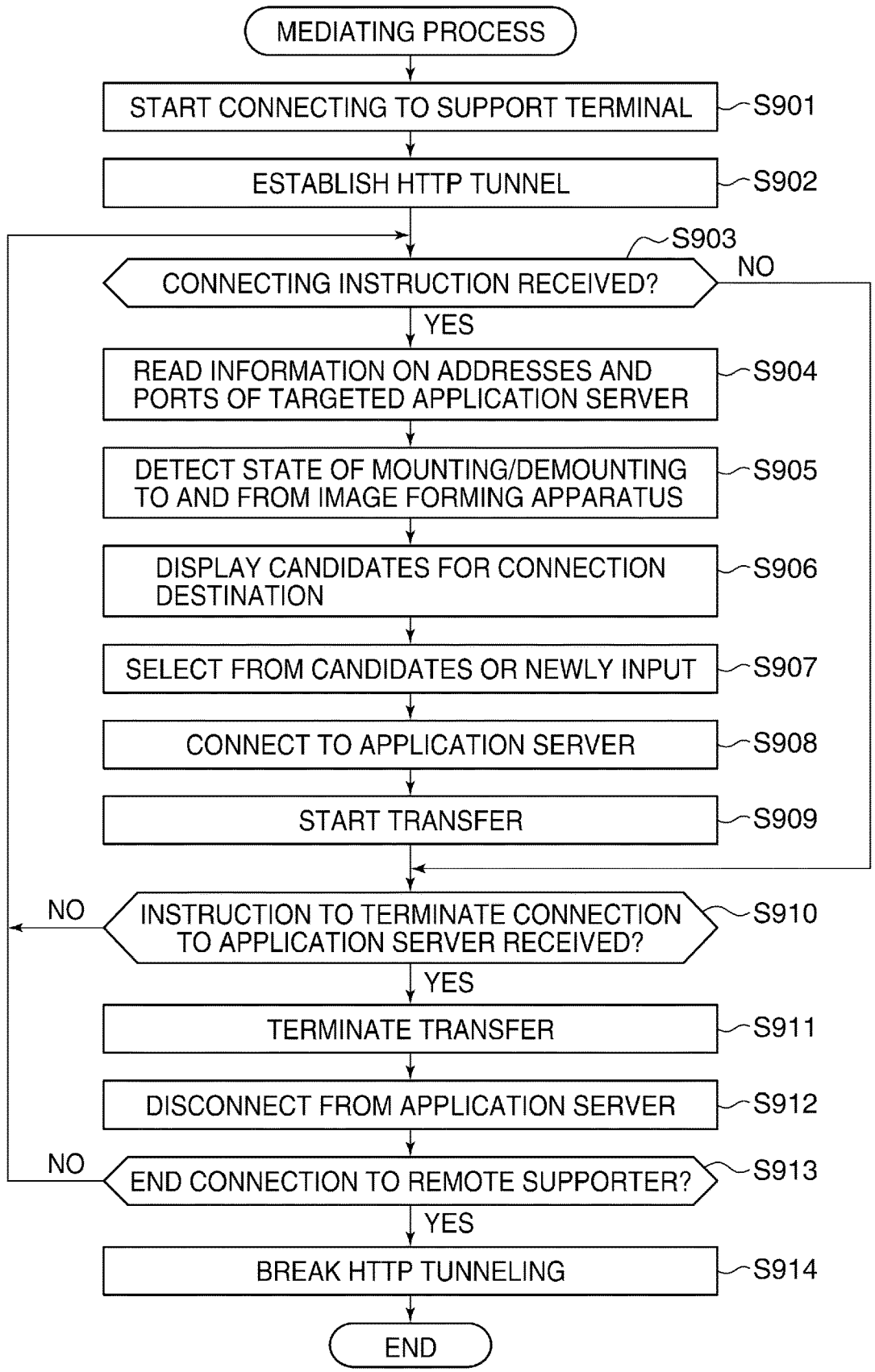
FIG. 9 is a flowchart showing a mediating process.

FIG. 9 is a flowchart showing a mediating process. The process of the flowchart shown in FIG. 9 is implemented by the CPU 201 of the mobile terminal 102 executing control programs expanded from the ROM 202 or the memory 204 into the RAM 203.

The descriptions of steps S901 to S904 are the same as those of steps 501 to S504 in FIG. 5, and therefore, descriptions thereof are omitted. In step S905, the connecting unit 303 detects a mounting state, that is, detects whether or not the mobile terminal 102 is mounted on the image forming apparatus 103 (mounted state or non-mounted state). Specifically, the CPU 201 detects whether or not the mounting unit 210 is connected to the mounting unit 225 of the image forming apparatus 103 in a communicative manner, and in a case where they are connected to each other, the CPU 201 determines that the mobile terminal 102 is mounted on the image forming apparatus 103 (the mounted state). In the case where the mobile terminal 102 and the image forming apparatus 103 are in the mounted state, the operating mode is the mounted mode. Namely, the mounted mode is a mode in which the mobile terminal 102 functions as an operating unit that operates the image forming apparatus 103 via the remote server 304 which is the application server of the mobile terminal 102 itself. On the other hand, in a case where the mounting unit 225 and the mounting unit 210 are not connected to each other in a communicative manner, the CPU 201 determines that the mobile terminal 102 and the image forming apparatus 103 are in a non-mounted state. In this case, the operating mode is a normal mode.

In a case where it is determined in the step S905 that the mobile terminal 102 and the image forming apparatus 103 are in the non-mounted state (that is, they are in the normal mode), in step S906, the operating unit 301 causes the operating panel 206 to display the same candidates as those displayed in the step S505 in FIG. 5. Thus, in the normal mode, the candidates include the remote server 304 and the remote server 323 as well. As a result, in a case where the mobile terminal 102 operates in the normal mode, the operating unit 301 performs a control in which application servers included in the mobile terminal 102 and application servers included in the image forming apparatus 103 are displayed as candidates for connectable application servers, on the operating panel 206 (display device) of the mobile terminal 102. On the other hand, in a case where it is determined in the step S905 that the mobile terminal 102 and the image forming apparatus 103 are in the mounted state (that is, they are in the mounted mode), in step S906, the operating unit 301 causes the operating panel 206 to display the remote server 304 of the mobile terminal 102 as a candidate for an application server that is to be a connection destination. As a result, in a case where the mobile terminal 102 operates in the mounted mode, the operating unit 301 performs a control in which application servers included in the mobile terminal 102 are displayed as candidates for connectable application servers, on the operating panel 206 of the mobile terminal 102 whereas application servers included in the image forming apparatus 103 are not displayed on the operating panel 206 of the mobile terminal 102. When the operating unit 322 is not acting as an operating unit for the image forming apparatus 103, connecting to the remote server 323 is meaningless in terms of remote support. Thus, in the mounted mode, the candidates do not include the remote server 323.

Then, in step S907, as with the step S506 in FIG. 5, the operating unit 301 determines an application server that is to be a connection destination. The descriptions of steps S908 to S914 are the same as those of steps S507 to S513, and therefore, descriptions thereof are omitted.

According to the present embodiment, from the viewpoint of enabling an apparatus on an operating side to provide direct and efficient remote support to an apparatus on an operated side via a network, the same effects as those in the first embodiment are achieved. Further, even in the case where the operating unit 301 of the mobile terminal 102 acts as an operating unit for the image forming apparatus 103, remote support is provided in an appropriate manner.

It should be noted that although in the embodiments described above, the support terminal 112 is taken as an example of an apparatus on an operating side (first apparatus), and the image forming apparatus 103 and the user PC 104 are taken as examples of an apparatus on an operated side (second apparatus), which is not limitative. It should be noted that although the mobile terminal 102 which is a smart device is taken as an example of the information processing apparatus that mediates communication between the first apparatus and second apparatus when the first apparatus remotely operates the second apparatus via a network, which is not limitative. For example, the information processing apparatus that mediates communication between the first apparatus and the second apparatus can be a desktop apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156464, filed Aug. 14, 2017, which is hereby incorporated by reference herein in its entirety.

What is claimed is:

1. A control method for a mobile terminal that mediates communication between a first apparatus and a second apparatus, each of the mobile terminal and the second apparatus providing a server function that enables the respective mobile terminal and second apparatus to operate as a server, wherein the first apparatus remotely operates the second apparatus via a network, wherein the mobile terminal further includes an operating device that selectively operates the mobile terminal in a first mode or a second mode, in the first mode, the mobile terminal operating the second apparatus using the operating device, and in the second mode, the mobile terminal operating the mobile terminal itself using the operating device, the control method comprising:

sending and receiving data to and from the first apparatus through a tunneling communication;

displaying, on a display device of the mobile terminal, after the tunneling communication is established, at least one candidate server to which the mobile terminal is connectable:

in the first mode, the server of the mobile terminal as one candidate server while not displaying the server of the second apparatus as another candidate server; and in the second mode, both the servers of the mobile terminal and the second apparatus as candidate servers;

transferring data received from the first apparatus to a candidate server selected by a user from among the displayed at least one candidate server; and transferring data received from the selected candidate server to the first apparatus through the tunneling communication.

2. The control method according to claim 1, wherein:
the mobile terminal mediates communication between the first apparatus and a plurality of second apparatuses each providing the server function that enables each second apparatus to operate as the server, and
the control method further comprises, in response to receipt of data from the first apparatus, in the second mode, determining one of the displayed plurality of candidate servers of the second apparatuses as a connection destination of the mobile terminal, and
mediating communication between the determined connection destination and the first apparatus.

3. The control method according to claim 2, further comprising determining the one connection destination based on information indicating a server type included in the data received from the first apparatus.

4. The control method according to claim 2, further comprising:
displaying, on the display device, in the second mode, the candidate servers, among the plurality of second apparatuses and the mobile terminal, in response to receipt of the data from the first apparatus; and
determining the candidate server selected by the user from among the displayed candidate servers as the connection destination.

5. The control method according to claim 1, wherein the selected candidate server is the server of the mobile terminal so that the transferring of the data received from the first apparatus transfers the data to the server of the mobile terminal and the transferring of the data received from the selected candidate server transfers the data from the server of the mobile terminal to the first apparatus through the tunneling communication.

6. A non-transitory computer-readable storage medium storing a program executable by a computer to execute a control method for a mobile terminal that mediates communication between a first apparatus and a second apparatus, each of the mobile terminal and the second apparatus providing a server function that enables the respective mobile terminal and second apparatus to operate as a server, wherein the first apparatus remotely operates the second apparatus via a network, wherein the mobile terminal further includes an operating device that selectively operates the mobile terminal in a first mode or a second mode, in the first mode, the mobile terminal operating the second apparatus using the operating device, and in the second mode, the mobile terminal operating the mobile terminal itself using the operating device, the control method comprising:

sending and receiving data to and from the first apparatus through a tunneling communication;

displaying, on a display device of the mobile terminal, after the tunneling communication is established, at least one candidate server to which the mobile terminal is connectable as follows:

in the first mode, the server of the mobile terminal as one candidate server on the display device of the mobile terminal while not displaying the server of the second apparatus as another candidate server; and in the second mode, both the servers of the mobile terminal and the second apparatus as candidate servers;

transferring data received from the first apparatus to a candidate server selected by a user from among the displayed at least one candidate server; and transferring data received from the selected candidate server to the first apparatus through the tunneling communication.

7. A mobile terminal that mediates communication between a first apparatus and a second apparatus, each of the mobile terminal and the second apparatus providing a server function to enable the respective mobile terminal and second apparatus to operate as a server, wherein the first apparatus remotely operates the second apparatus via a network, the mobile terminal comprising:

an operating device that selectively operates the mobile terminal in a first mode or a second mode, in the first mode, the mobile terminal operating the second apparatus using the operating device, and in the second mode, the mobile terminal operating the mobile terminal itself using the operating device;

a display device;

a memory device that stores instructions; and at least one processor that implements the instructions to:
send and receive data to and from the first apparatus through a tunneling communication;

display, on the display device, after the tunneling communication is established, at least one candidate server to which the mobile terminal is connectable as follows:
- in the first mode, the server of the mobile terminal as one candidate server while not displaying the server of the second apparatus as another candidate server; and
- in the second mode, both the servers of the mobile terminal and the second apparatus as candidate servers;

transfer data received from the first apparatus to a candidate server selected by a user from among the at least one displayed candidate server; and transfer data received from the selected candidate server to the first apparatus through the tunneling communication.

8. A remote support system including a first apparatus, a second apparatus remotely operable by the first apparatus via a network, and a mobile terminal that mediates communication between the first apparatus and the second apparatus, each of the second apparatus and the mobile terminal providing a server function to enable the respective second apparatus and mobile terminal to operate as a server, the remote support system comprising:

a display device;
a memory device that stores instructions; and
at least one processor that implements the instructions to:
- in the first apparatus, send and receive data to and from the mobile terminal through a tunneling communication;
- in the mobile terminal, send and receive data to and from the first apparatus through the tunneling communication;
- in the mobile terminal, display, on the display device, after the tunneling communication is established between the mobile terminal and the first apparatus, at least one candidate server to which the mobile terminal is connectable as follows:
  - in the first mode, the server of the mobile terminal as one candidate server while not displaying the server of the second apparatus as another candidate server; and
  - in the second mode, both the servers of the mobile terminal and the second apparatus as candidate servers;
- transfer data received from the first apparatus to a candidate server selected by a user from among the displayed at least one candidate server; and
- transfer data received from the candidate server to the first apparatus through the tunneling communication.

* * * * *